United States Patent
Kim et al.

(10) Patent No.: US 9,477,111 B2
(45) Date of Patent: Oct. 25, 2016

(54) DISPLAY DEVICE AND TOUCH SENSING METHOD THEREOF

(71) Applicant: LG DISPLAY CO., LTD., Seoul (KR)

(72) Inventors: Hoon Bae Kim, Goyang-si (KR); Cheol Se Kim, Daegu (KR); Sungsu Han, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 136 days.

(21) Appl. No.: 13/859,399

(22) Filed: Apr. 9, 2013

(65) Prior Publication Data

US 2014/0160061 A1 Jun. 12, 2014

(30) Foreign Application Priority Data

Dec. 9, 2012 (KR) .................... 10-2012-0142407

(51) Int. Cl.
| | |
|---|---|
| *G06F 3/045* | (2006.01) |
| *G09G 3/20* | (2006.01) |
| *G02F 1/1333* | (2006.01) |
| *G06F 3/041* | (2006.01) |
| *G06F 3/044* | (2006.01) |
| *G09G 3/36* | (2006.01) |

(52) U.S. Cl.
CPC ........... *G02F 1/13338* (2013.01); *G06F 3/044* (2013.01); *G06F 3/0412* (2013.01); *G06F 3/0416* (2013.01); *G09G 3/36* (2013.01)

(58) Field of Classification Search
CPC .................................................... G06F 3/0412
USPC ........................................ 345/174, 103, 173
See application file for complete search history.

(56) References Cited

U.S. PATENT DOCUMENTS

| | | | |
|---|---|---|---|
| 2008/0309627 A1* | 12/2008 | Hotelling et al. ............ | 345/173 |
| 2009/0289919 A1 | 11/2009 | Jung et al. | |
| 2010/0001970 A1 | 1/2010 | Yamashita | |
| 2010/0194695 A1* | 8/2010 | Hotelling .............. | G06F 3/0412 |
| | | | 345/173 |
| 2010/0194698 A1* | 8/2010 | Hotelling et al. ............ | 345/173 |
| 2011/0102360 A1 | 5/2011 | Chen et al. | |
| 2011/0298727 A1 | 12/2011 | Yousefpor et al. | |
| 2012/0050217 A1 | 3/2012 | Noguchi et al. | |
| 2012/0056835 A1* | 3/2012 | Choo et al. ................... | 345/173 |

(Continued)

FOREIGN PATENT DOCUMENTS

| | | |
|---|---|---|
| EP | 2 477 100 A2 | 7/2012 |
| EP | 2 503 435 A2 | 9/2012 |
| JP | 8-122747 A | 5/1996 |
| JP | 2009-301006 A | 12/2009 |

(Continued)

*Primary Examiner* — Andrew Sasinowski
*Assistant Examiner* — Kuo Woo
(74) *Attorney, Agent, or Firm* — Birch, Stewart, Kolasch & Birch, LLP

(57) ABSTRACT

Discussed is a display device. The display device includes a display panel including a plurality of gate lines and a plurality of data lines, a timing controller temporally dividing one frame period and driving the display panel such that a display mode for displaying an image in the display panel and a touch mode for sensing the user touch are alternately driven, a gate driver, and a data driver. Some of the gate lines and some of the data lines overlap each of a plurality of touch electrodes that are units for sensing a user touch. The gate driver simultaneously turns on a plurality of switching elements respectively connected to the gate lines overlapping each touch electrode in the touch mode. The data driver outputting display data having the same level to the respective data lines overlapping each touch electrode when the switching elements are turned on.

20 Claims, 7 Drawing Sheets

(56) References Cited

U.S. PATENT DOCUMENTS

| | | |
|---|---|---|
| 2012/0075240 A1 | 3/2012 | Kida et al. |
| 2012/0182251 A1 | 7/2012 | Krah |
| 2012/0212472 A1 | 8/2012 | Harada et al. |
| 2012/0242597 A1 | 9/2012 | Hwang et al. |
| 2014/0176459 A1* | 6/2014 | Pyo ................................ 345/173 |
| 2014/0210771 A1* | 7/2014 | Kim et al. .................... 345/174 |

FOREIGN PATENT DOCUMENTS

| | | |
|---|---|---|
| JP | 2010-15051 A | 1/2010 |
| JP | 2010-277443 A | 12/2010 |
| JP | 2012-48295 A | 3/2012 |
| JP | 2012-73465 A | 4/2012 |
| JP | 2012-173469 A | 9/2012 |
| JP | 2012-203901 A | 10/2012 |

* cited by examiner

DISPLAY DEVICE AND TOUCH SENSING METHOD THEREOF

CROSS-REFERENCE TO RELATED APPLICATIONS

This application claims the benefit of the Korean Patent Application No. 10-2012-0142407 filed on Dec. 9, 2012, which is hereby incorporated by reference as if fully set forth herein.

BACKGROUND

1. Field of the Invention

The present invention relates to a display device and a touch sensing method thereof, and more particularly, to a display device with integrated touch sensor and a touch sensing method thereof.

2. Discussion of the Related Art

With the advancement of various portable electronic devices such as mobile terminals and notebook computers, the demand for flat panel display devices applied to the portable electronic devices is increasing.

Liquid crystal display (LCD) devices, plasma display panels (PDPs), field emission display (FED) devices, light emitting diode (LED) display devices, and organic light emitting diode (OLED) display devices have been developed as flat panel display devices.

In such flat panel display devices, LCD devices are easily manufactured by advanced manufacturing technology and have drivability of drivers, low power consumption, high image quality, and a large screen, and thus, the application fields of the LCD devices are being expanded. LCD devices, including a built-in touch screen that enables a user to directly input information to a screen with a finger or a pen, are attracting much attention.

In applying a touch screen to LCD devices, a separately prepared touch panel is conventionally disposed on a liquid crystal panel, but, liquid crystal panels with a built-in touch screen are developed for slimming.

Especially, LCD devices using the existing elements, such as common electrodes formed in a lower substrate, as touch sensing electrodes are called in-cell touch LCD devices.

In in-cell touch LCD devices, a liquid crystal panel for displaying an image display and a touch screen for sensing a user's touch are temporally divided and driven (time-divisional driven) due to a structural characteristic in which a plurality of pixels for the liquid crystal panel and the touch screen (that the liquid crystal panel in which a plurality of pixels for an image display are disposed and the touch screen in which a plurality of touch driving electrodes and touch sensing electrodes are arranged) are provided together.

During a touch sensing period (non-display period), when a capacitance is changed in a touch sensing block touched by a user's finger (due to a touch by a user's finger), a touch sensing electrode senses (the touch sensing electrodes sense) the capacitance change, thereby determining whether there is the user's touch and a position touched by the user.

In the related art, however, when touch sensors (sensing electrodes) are disposed outside a liquid crystal panel, an image display function and a touch sensing function are separately performed, and thus no interferer between the two functions can occur. On the other hand, when the touch sensors (sensing electrodes) are built in the liquid crystal panel, the image display function and the touch sensing function may interfere with each other.

That is, touch sensing driving can affect display driving, or vice versa, the display driving can affect the touch sensing driving. This will now be described in more detail with reference to FIG. 1.

FIG. 1 is a view showing a capacitance change in a pixel displaying black and a capacitance change in a pixel displaying white, in a related art in-cell touch type LCD device.

As seen in FIG. 1, a pixel "Black" displaying black and a pixel "White" displaying white differ in alignment of liquid crystal, and thus, a difference "Cm_w−Cm_b" between capacitances of a liquid crystal layer occurs.

The capacitance difference between pixels is maintained in the pixels even after a touch sensing period is started, and thus affects touch sensitivity. The capacitance difference functioning like offset to act as noise to touch sensing is called display touch crosstalk.

The display touch crosstalk reduces the accuracy and stability of touch.

SUMMARY

Accordingly, the present invention is directed to providing a display device and a touch sensing method thereof that substantially obviate one or more problems due to limitations and disadvantages of the related art.

An aspect of the present invention is directed to provide a display device with reduced display touch crosstalk and a touch sensing method thereof.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a display panel including a plurality of gate lines and a plurality of data lines, some of the gate lines and some of the data lines overlapping each of a plurality of touch electrodes that are units for sensing a user touch; a timing controller temporally dividing one frame period and driving the display panel such that a display mode for displaying an image in the display panel and a touch mode for sensing the user touch are alternately driven; a gate driver simultaneously turning on a plurality of switching elements respectively connected to the gate lines overlapping each touch electrode in the touch mode; and a data driver outputting display data having the same level to the respective data lines overlapping each touch electrode when the switching elements are turned on.

In another aspect of the present invention, there is provided a touch sensing method of a display device, temporally dividing one frame period and driving a display panel such that a display mode for displaying an image in the display panel and a touch mode for sensing a user touch are alternately driven, including: simultaneously turning on a plurality of switching elements respectively connected to a plurality of gate lines overlapping a touch electrode in the touch mode, the touch electrode being a unit for sensing the user touch; outputting display data having the same level to a plurality of data lines overlapping the touch electrode when the switching elements are turned on; and determining whether there is the user touch by using touch raw data received from the touch electrode in response to a touch sync signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Hereinafter, a display device and a touch sensing method thereof according to the present invention will be described in detail with reference to the accompanying drawings.

In an embodiment, a display device according to the present invention may be an LCD device. Hereinafter, for convenience, the LCD device will be described as an example of the display device according to the present invention. However, the display device according to the present invention is not limited to the LCD device, and may be a display device such as an LED display device, an OLED display device, or the like.

LCD devices are variously developed in a twisted nematic (TN) mode, a vertical alignment (VA) mode, an in-plane switching (IPS) mode, or a fringe field switching (FFS) mode depending on a scheme of adjusting the alignment of liquid crystal.

In such modes, the IPS mode and the FFS mode are modes in which a plurality of pixel electrodes and common electrodes are arranged on a lower substrate, and thus, the alignment of liquid crystal is adjusted with electric fields between the pixel electrodes and the common electrodes.

The present invention may be applied to an LCD device having a structure in which a plurality of pixels electrodes and common electrodes are disposed on a lower substrate as in the IPS mode or the FFS mode.

However, the present invention is not limited thereto, and may be an LCD device having a structure in which the pixel electrodes are disposed on the lower substrate and the common electrodes are disposed on an upper substrate as in the TN mode or the VA mode.

<First Embodiment of Display Device>

Figure 1:
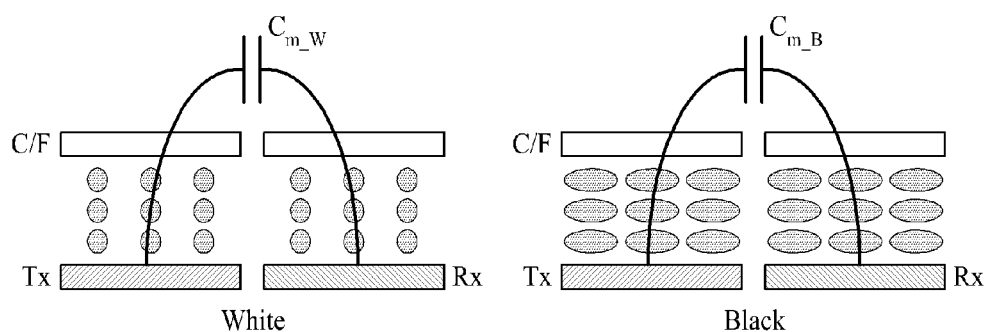
FIG. 1 is a view showing a changed capacitance in a pixel displaying black and a changed capacitance in a pixel displaying white, in a related art in-cell touch type LCD device.
Figure 2:
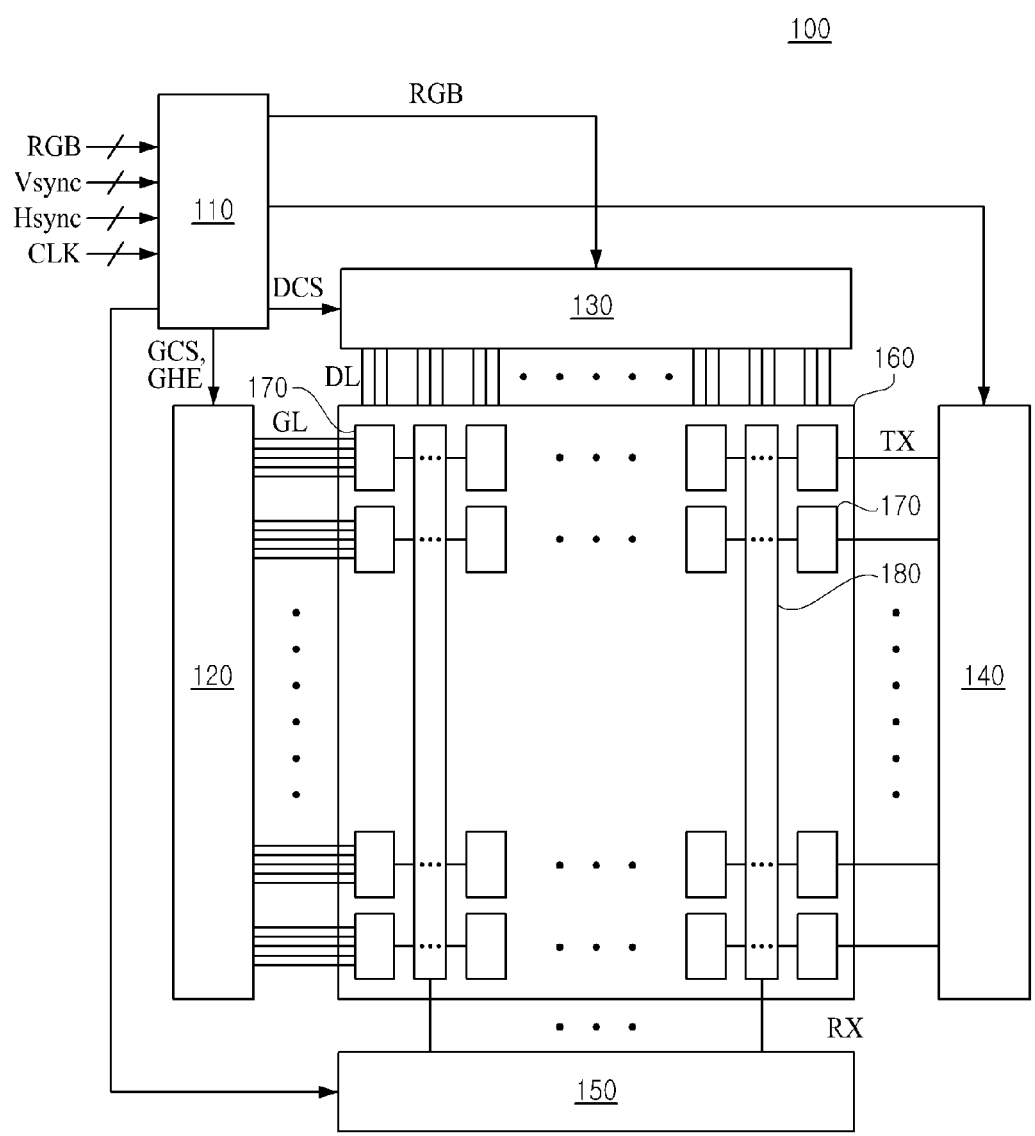
FIG. 2 is a diagram illustrating an embodiment of a display device according to the present invention.

FIG. 2 is a diagram illustrating an embodiment of a display device according to the present invention.

As seen in FIG. 2, a display device 100 according to the present invention includes a timing controller 110, a gate driver 120, a data driver 130, a touch driver 140, a touch sensing unit 150, a display panel 160, and a plurality of touch electrodes 170 and 180.

The timing controller 110 temporally divides one frame period (into a time period in which an image is to be displayed and a time period in which a user's touch is to be sensed) and drives the display panel 160 such that a display mode for displaying an image in the display panel 160 and a touch mode for sensing a user's touch are alternately driven.

In the display mode, the timing controller 110 aligns external video signals to convert the video signals into frame-unit digital image data RGB, and supplies the digital image data to the data driver 130.

In the display mode, the timing controller 110 generates a gate control signal GCS for controlling the gate driver 120 and a data control signal DCS for controlling the data driver 130 by using a vertical sync signal Vsync, a horizontal sync signal Hsync, and a clock signal CLK which are input from the outside.

The gate control signal GCS is supplied to the gate driver 120, and the data control signal DCS is supplied to the data driver 130.

Here, the data control signal DCS may include a source start pulse SSP, a source sampling clock SSC, a source output enable signal SOE, and a polarity control signal POL.

The gate control signal GCS may include a gate start pulse GSP, a gate shift clock GSC, and a gate output enable signal GOE.

In the touch mode, the timing controller 110 outputs a gate high enable signal GHE for enabling a plurality of switching elements respectively connected to a plurality of gate lines spatially overlapping the touch electrodes 170 and 180 that constitute a minimum unit for sensing a user's touch to be turned on.

In the touch mode, the switching elements are turned on, and then, the timing controller 110 outputs a touch sync signal to the touch sensing unit 150. In response to the touch sync signal, the touch sensing unit 150 determines whether there is a user's touch based on sensing signals received from the touch electrodes 170 and 180.

The following description will be made of an operation in which the display mode for displaying an image in the display panel 160 and the touch mode for sensing a user's touch are temporally divided (time divisional) and alternately driven by the timing controller 110 during one frame period.

Figure 3:
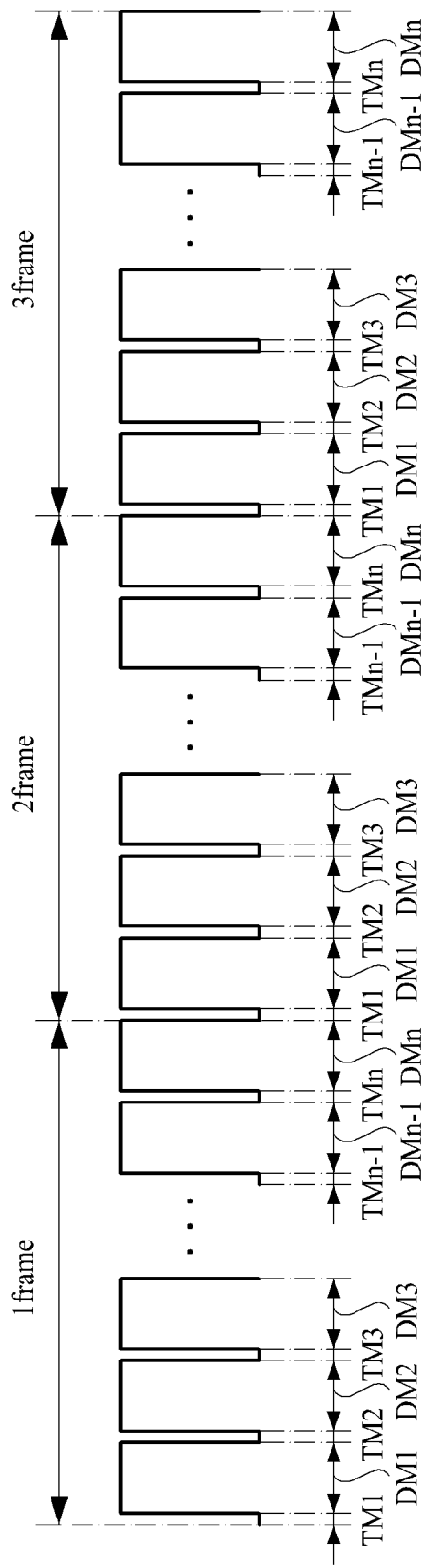
FIG. 3 is a diagram showing an operation in which a display mode and a touch mode are temporally divided and alternately driven, in the display device according to the present invention.

FIG. 3 is a diagram showing an operation in which the display mode and the touch mode are temporally divided (time divisional) and alternately driven, in the display device according to the present invention.

As seen in FIGS. 2 and 3, the timing controller 110 of the display device 100 according to the present invention temporally divides one frame period (into a time period in which an image is to be displayed and a time period in which a user's touch is to be sensed) and drives the display panel 160 such that the display mode DM for displaying an (the) image in the display panel 160 and the touch mode TM for sensing a (the) user's touch are alternately driven. That is, the display panel 160 is time divisional and alternately driven in terms of the display mode DM and the touch mode TM.

The display mode denotes a mode for displaying a desired image in the display panel 160, and the touch mode denotes a mode for sensing a user's touch and a touch position touched by the user on the display panel 160.

In an embodiment, when a plurality of the touch driving electrodes 170 are disposed in n rows in a direction parallel to the gate line in the display panel 160, the timing controller 110 alternately drives the touch mode TM and the display mode DM n times so as to sense a user's touch by using the touch driving electrodes 170 disposed in all rows during one frame. Here, n is a natural number.

Specifically, the timing controller 110 drives a touch mode TM1 and a display mode DM1 during one frame period with respect to a touch driving electrode (the touch driving electrodes) 170 disposed in a first row (with respect to a first touch driving line TX1), drives a touch mode TM2 and a display mode DM2 during one frame period with respect to a touch driving electrode 170 disposed in a second row (with respect to a second touch driving line TX2), drives a touch mode TM(n−1) and a display mode DM(n−1) during one frame period with respect to a touch driving electrode 170 disposed in an n−1st row (with respect to an (n−1)th touch driving line TX(n−1)), and drives a touch mode TMn and a display mode DMn during one frame period with respect to a touch driving electrode 170 disposed in an nth row (with respect to an nth touch driving line TXn), thereby time-divisional controlling the touch driving electrodes 170 disposed in a total of n rows.

To provide a description on a XGA-class TFT-LCD device including 768 gate lines as an example, a time for which a thin film transistor (TFT) connected to a gate line is turned on is 21 microsecond (μs) or less, and, when the TFT is refreshed at a speed of 60 frames per second, one frame time is 16.7 millisecond (ms). Therefore, the touch mode and the display mode, which are alternately driven, are repeatedly performed at intervals of 16.7 ms.

In this case, the touch mode is maintained for a time period relatively shorter than a time period in which the display mode is maintained. That is, the touch mode is maintained and driven for a short time period compared to the time period for maintaining and driving the display mode, and thus does not affect the quality of an image displayed by a liquid crystal panel. In an embodiment, the touch mode may be driven for one-tenth, one-fortieth, or less of a time for which the display mode is driven.

In an embodiment, the touch mode in one frame is temporally subdivided according to the number of the touch driving electrodes 170 which are disposed in a direction parallel to the touch driving lines TX, and the touch driving electrodes 170 connected to respective touch driving lines TX sequentially sense a user's touch.

For example, in order to sense a user's touch in a first row of touch driving line TX1, the timing controller 110 applies the gate high enable signal GHE to the gate driver 120, and the gate driver 120, in response to the gate high enable signal GHE, applies a gate high voltage VGH to a plurality of gate lines spatially overlapping the touch driving electrode 170, whereupon the data driver 130 outputs display data having the same level to the corresponding data lines. Therefore, when display data between (to be displayed by the) pixels corresponding to the first-row touch driving line TX have the same level, the timing controller 110 outputs the touch sync signal to the touch sensing unit 150 to enable the sensing of a user's touch.

Subsequently, in order to sense a user's touch in a second row of touch driving line TX2, the timing controller 110 applies the gate high enable signal GHE to the gate driver 120, and the gate driver 120 applies the gate high voltage VGH to a plurality of gate lines spatially overlapping the touch driving electrode 170, whereupon the data driver 130 outputs display data having the same level to the corresponding data lines. Therefore, when display data to be displayed by the pixels corresponding to the second-row touch driving line TX have the same level, the timing controller 110 outputs the touch sync signal to the touch sensing unit 150 to enable the sensing of a user's touch.

In this way, touch driving electrodes 170 disposed in a last row sequentially sense a user's touch after the touch mode is ended (in this way, a user's touch in the last row of touch driving line TXn is sensed (after the touch mode is ended)). That is, the user's touch is sensed sequentially from the first row of touch driving line to the last row of touch driving line).

In the touch mode, the gate driver 120 turns on a plurality of switching elements respectively connected to a plurality of gate lines spatially overlapping the touch electrodes 170 and 180 that constitute a minimum unit for sensing a user's touch.

The touch electrodes 170 and 180 function as a touch driving electrode 170 and a touch sensing electrode 180 respectively. A plurality of touch driving electrodes 170 are arranged in a direction parallel to a gate line, and connected to one touch driving line TX.

In an embodiment, when the gate high enable signal GHE is input from the timing controller 110, the gate driver 120 applies the gate high voltage VGH to a plurality of gate lines spatially overlapping the touch driving electrode 170, thereby turning on a plurality of switching elements.

When the respective switching elements connected to the gate lines spatially overlapping the touch driving electrode 170 are turned on, the data driver 130 outputs display data having the same level to a plurality of data lines spatially overlapping the touch driving electrode 170.

In an embodiment, when the respective switching elements connected to the gate lines spatially overlapping the touch driving electrode 170 are turned on, the data driver 130 outputs display data for black display to a plurality of data lines spatially overlapping the touch driving electrode 170. That is, in the embodiment, the display data having the same level may be the display data for black display.

In the related art, since data having different grayscale values are input to respective pixels during the display mode, a capacitance difference between pixels occurs, and thus, display crosstalk occurs in sensing a user's touch during the touch mode. However, by applying display data having the same level to respective pixels corresponding to the touch electrodes 170 and 180 for sensing a user's touch in the touch mode, the display crosstalk can be prevented.

The data driver 130 first outputs the display data having the same level to the switching elements so as to sense the user's touch during the touch mode, and then outputs display data for an image display to the plurality of data lines spatially overlapping the touch driving electrode 170 during the display mode, thereby enabling a desired image to be displayed after the touch mode is ended.

In the touch mode, when the touch sync signal is input from the timing controller 110 to the touch sensing unit 150, the touch driver 140 applies a driving signal to the touch driving electrodes 170 through a touch driving line TX, and the touch sensing unit 150 senses a user's touch based on a sensing signals received from the touch sensing electrode 180 through a touch sensing line RX.

In the touch mode, in response to the gate high enable signal GHE, the gate high voltage VGH is first output to a plurality of gate lines spatially overlapping the touch driving electrode 170, and then, the touch sync signal is input to the touch sensing unit 150, in response to the touch sync signal, the touch sensing unit 150 senses whether there is a user's touch based on a sensing signal received from the touch sensing electrode 180.

The display panel 160 includes a plurality of gate lines GL, a plurality of data lines DL, and a plurality of pixel electrodes and common electrodes. The display panel 160 displays a desired image during the display mode, and senses a user's touch during the touch mode.

Each of the touch electrodes, which are units for sensing a user's touch (each of a minimum unit for sensing a user's touch, which is constituted by a touch driving electrode and a touch sensing electrode), spatially overlaps some of the gate lines and some of the data lines. Specifically, the plurality of gate lines and data lines arranged on the display panel can be grouped into a plurality of sub-groups, and each group including more than one gate lines or date lines are spatially overlapped by each of the touch electrodes which constitute a minimum unit for sensing a user's touch. The number of the gate lines and the number of the data lines in each sub-group can be different.

The gate lines GL are arranged in one direction (for example, a width direction) on a substrate. The data lines DL are arranged in the other direction (for example, a length direction) on the substrate. Therefore, the gate lines GL and the data lines DL are arranged to intersect each other, thereby defining a plurality of pixel areas (pixels). For example, each of the pixels may be one of red (R), green (G), blue (B), and white (W) pixels. The data lines DL may be disposed on a layer different from the layer on which the gate lines GL are disposed. Each of the data lines DL may be formed in a straight line, but is not limited thereto. As another example, each data line DL may be formed in a curved-line shape.

Although not shown, each of a plurality of TFTs is a switching element, and is disposed in an area defined by intersection of a corresponding gate line GL and data line DL. The TFT may include a gate electrode, a semiconductor layer, a source electrode, and a drain electrode. The gate electrode is formed to be connected to the gate line GL, the source electrode is formed to be connected to the data line DL, and the drain electrode is formed apart from the source electrode to face the source electrode. The configuration of the TFT may be variously changed to have a bottom gate structure in which the gate electrode is disposed under the semiconductor layer or a top gate structure in which the gate electrode is disposed on the semiconductor layer, and moreover, the structure of each of the electrodes may be changed to have various structures known to those skilled in the art.

The pixel electrode is disposed in each pixel area, and electrically connected to the drain electrode of the TFT. Especially, the pixel electrode may be directly connected to the drain electrode, but is not limited thereto.

In the display mode for image display, the common electrodes receive a common voltage Vcom, thereby enabling the display of an image. In the touch mode for sensing a user's touch, the common electrodes are driven as touch electrodes to detect a touch.

Specifically, in the display mode, the common electrodes generate electric fields together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven by the fringe field.

Each common electrode, as described above, generates an electric field together with the pixel electrodes to drive the liquid crystal, and moreover, in the touch mode, each common electrode generate a capacitance together with a touch object (for example, a finger or a pen) so as to enable the sensing of a position touched by a user.

The touch electrodes 170 and 180 are electrodes for sensing a user's touch, and may be formed by patterning the common electrodes that are disposed in the display panel 160 and generate electric fields together with the pixel electrodes to enable the display of an image in the display mode.

In this case, the common electrodes generate electric fields together with the pixel electrodes, which are disposed in the respective pixel areas defined by intersection of the gate lines and data lines that are arranged to intersect each other on the substrate, to enable the display of an image during the display mode. In the touch mode, the common electrodes may act as touch electrodes for sensing a changed capacitance due to a user's touch.

Figure 4:
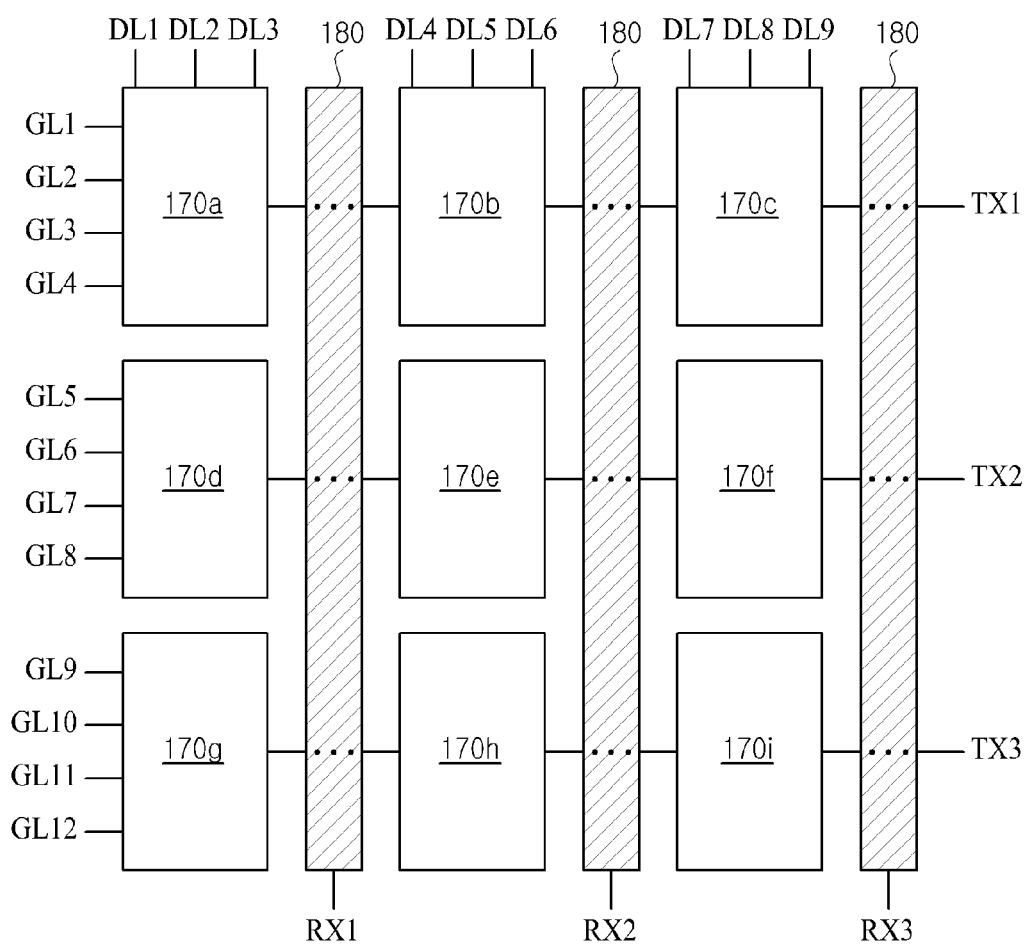
FIG. 4 is a diagram illustrating an embodiment of touch electrodes in the display device according to the present invention.

FIG. 4 is a diagram illustrating an embodiment of the touch electrodes in the display device according to the present invention.

As seen in FIGS. 2 and 4, according to an embodiment of the present invention, the touch driving electrode 170 is divided into a plurality of touch driving electrodes 170a to 170i. Hereinafter, for convenience of a description, it is assumed that the display panel 160 includes three touch driving electrodes 170a to 170i in a width direction and three touch driving electrodes 170a to 170i in a length direction, and each touch driving electrode spatially overlaps four gate lines and three data lines, namely, corresponds to a total of twelve pixels.

The touch driving electrode 170 and the touch sensing electrode 180 constitute the minimum unit for sensing a user's touch. In an embodiment, the touch driving electrode 170 may be formed by patterning the common electrode.

The touch driving electrode 170 is a portion of the patterned common electrode, and one touch driving line which is formed in a direction parallel to a corresponding gat line is connected to a plurality of touch driving electrodes. That is, three touch driving electrodes 17a to 170c may be connected to a first touch driving line TX1, three touch driving electrodes 17d to 170f may be connected to a second touch driving line TX2, and three touch driving electrodes 17g to 170i may be connected to a third touch driving line TX3.

The touch driving lines TX1 to TX3 are connected to the touch driver 140, and receive touch driving signals.

A plurality of pixels are provided under one touch driving electrode 170, and the numbers of gate lines and data lines disposed under one touch driving electrode 170 may be adaptively changed depending on the touch resolution of an application product. That is, by patterning the touch driving electrode 170 so as to spatially overlap a small number of gate lines and data lines, touch resolution increases, and, by patterning the touch driving electrode 170 so as to spatially overlap a large number of gate lines and data lines, the touch resolution decreases.

The touch sensing electrode 180 may be a portion of the patterned common electrode, or may be an electrode which is formed separately from the common electrode. The touch sensing electrode 180 is connected to the touch sensing unit 150 along a touch sensing line RX1, and senses a capacitance changed by a user's touch. The touch sensing electrode 180 may be disposed in a direction parallel to a corresponding data line.

The touch driving electrode 170 and the touch sensing electrode 180 may be disposed on the same layer because they can be formed by splitting the common electrode. However, the display device according to the present invention is not limited thereto.

When the display panel 160 is touched by a user, a capacitance is changed due to a change in an electric field generated by the touch driving electrode 170 and the touch sensing electrode 180, the touch sensing unit 150 may determine whether there is the user's touch by sensing the changed capacitance.

<Second Embodiment of Display Device>

Figure 5:
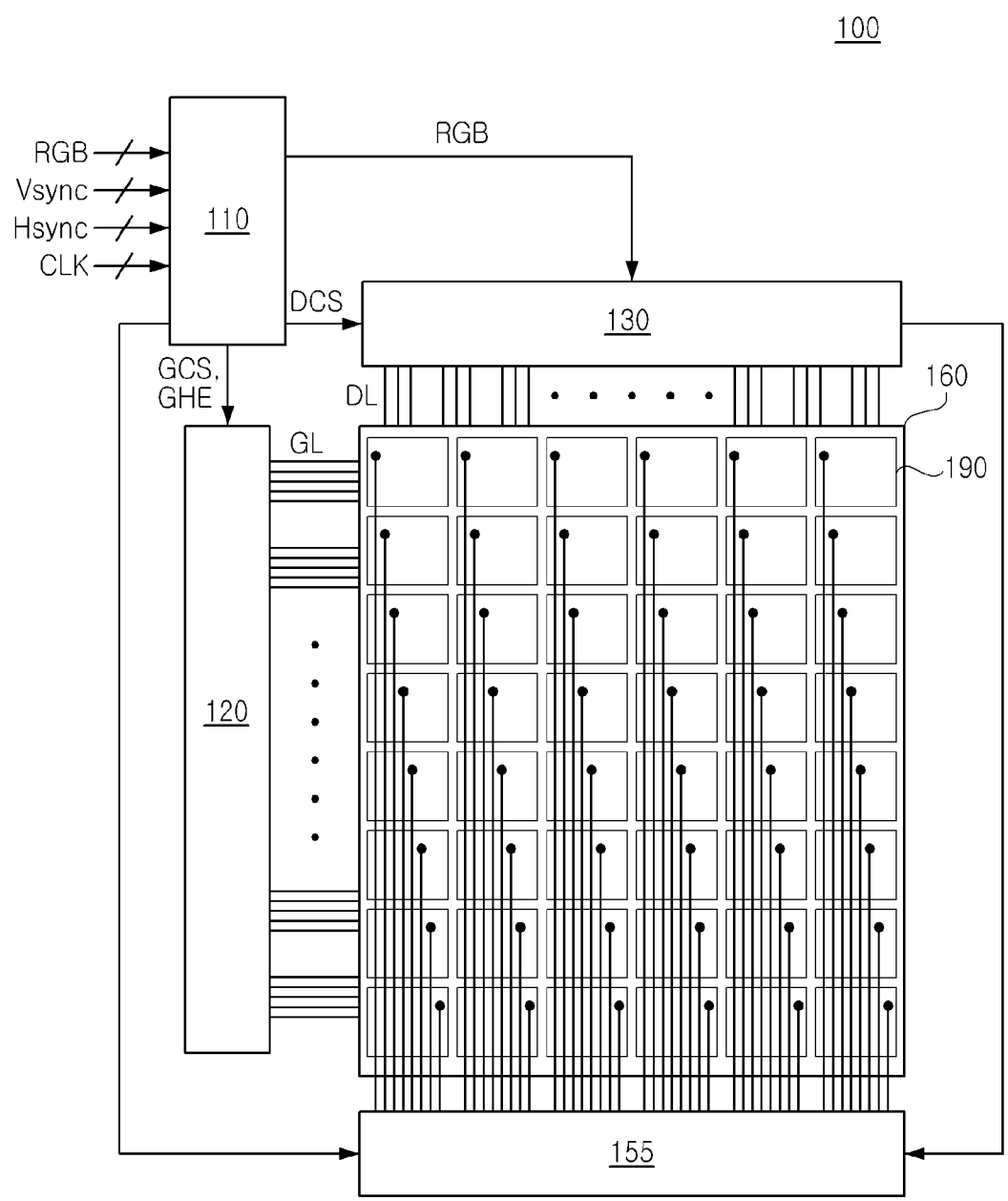
FIG. 5 is a diagram illustrating another embodiment of the display device according to the present invention.

FIG. 5 is a diagram illustrating another embodiment of the display device according to the present invention.

As seen in FIG. 5, a display device 100 according to another embodiment of the present invention includes a timing controller 110, a gate driver 120, a data driver 130, a touch sensing unit 155, a display panel 160, and a plurality of touch sensing blocks 190. Hereinafter, to avoid a repetitive description, the following description will focus on a difference between the first and second embodiments.

The timing controller 110 temporally divides one frame period (into a time period in which an image is to be displayed and a time period in which a user's touch is to be sensed) and drives the display panel 160 such that a display mode for displaying an (the) image in the display panel 160 and a touch mode for sensing a (the) user's touch are alternately driven.

In this case, the touch mode is maintained for a time period relatively shorter than a time period in which the display mode is maintained. That is, the touch mode is maintained and driven for a short time period compared to the time period for maintaining and driving the display mode, and thus does not affect the quality of an image displayed by a liquid crystal panel. In an embodiment, the touch mode may be driven for one-tenth, one-fortieth, or less of a time for which the display mode is driven.

In order to sense a user's touch by using the touch sensing block 190, the timing controller 110 applies the gate high enable signal GHE to the gate driver 120, and the gate driver 120 applies a gate high voltage VGH to a plurality of gate lines spatially overlapping the touch sensing block 190, whereupon the data driver 130 outputs display data having the same level to the corresponding data lines. Therefore, when display data to be displayed by the pixels corresponding to the touch sensing block 190 have the same level, the timing controller 110 outputs the touch sync signal, thereby enabling the sensing of a user's touch.

In the touch mode, the gate driver 120 turns on a plurality of switching elements respectively connected to a plurality of gate lines spatially overlapping the touch sensing block 190 that is the minimum unit for sensing a user's touch.

In an embodiment, when the gate high enable signal GHE is input from the timing controller 110, the gate driver 120 applies the gate high voltage VGH to a plurality of gate lines spatially overlapping the touch sensing block 190, thereby turning on a plurality of switching elements.

When the respective switching elements connected to the gate lines spatially overlapping the touch sensing block 190 are turned on, the data driver 130 outputs display data having the same level to a plurality of data lines spatially overlapping the touch sensing block 190.

In an embodiment, when the respective switching elements connected to the gate lines spatially overlapping the touch sensing block 190 are turned on, the data driver 130 outputs display data for black display to a plurality of data lines spatially overlapping the touch sensing block 190.

In the related art, since data having different grayscale values are input to respective pixels during the display mode, a capacitance difference between pixels occurs, and thus, display crosstalk occurs in sensing a user's touch during the touch mode. However, by applying display data having the same level to respective pixels corresponding to the touch sensing block 190 for sensing a user's touch when the touch mode is started (during the touch mode), the display crosstalk can be prevented.

The data driver 130 outputs display data having the same level (not shown in the figures) to the switching elements to sense the user's touch, and then outputs display data for image display (refers to the image which is required to be displayed) to the respective switching elements during the display mode, thereby enabling a desired image to be displayed after the touch mode is ended.

In the touch mode, in response to the gate high enable signal GHE, the gate high voltage VGH is first output to a plurality of gate lines spatially overlapping the touch sensing block 190, and then, the touch sync signal is input to the touch sensing unit 155, in response to the touch sync signal, the touch sensing unit 155 senses whether there is a user's touch based on a sensing signal received from the touch sensing block 190.

The display panel 160 includes a plurality of gate lines GL, a plurality of data lines DL, and a plurality of pixel electrodes and common electrodes. The display panel 160 displays a desired image during the display mode, and senses a user's touch during the touch mode.

In the display mode for image display, the common electrodes receive a common voltage Vcom, thereby enabling the display of an image. In the touch mode for sensing a user's touch, the common electrodes are driven as touch electrodes to detect a touch.

Specifically, in the display mode, the common electrodes generate electric field together with the pixel electrodes to drive a liquid crystal layer. In an embodiment, each of the common electrodes or pixel electrodes may include at least one or more slits in a corresponding pixel area. A fringe field may be generated between a corresponding common electrode and pixel electrode through the slit, and liquid crystal may be driven by the fringe field.

Each common electrode, as described above, generates an electric field together with the pixel electrodes to drive the liquid crystal, and moreover, in the touch mode, each common electrode generate a capacitance together with a touch object (for example, a finger or a pen) so as to enable the sensing of a position touched by a user.

A touch electrode can be divided into a plurality of touch sensing blocks 190, each of which is a minimum unit for sensing a user's touch.

The touch sensing blocks 190 may be formed by patterning the common electrode that is disposed in the display panel 160 and generates an electric field together with the pixel electrode to enable the display of an image in the display mode.

Each of the touch sensing blocks 190 is connected to the touch sensing unit 155, and detects a capacitance changed by a user's touch to transfer the changed capacitance to the touch sensing unit 155.

<Touch Sensing Method of Display Device>

Hereinafter, a touch sensing method of a display device according to the present invention will be described in detail with reference to the drawings. In the following description, for convenience of a description, it is assumed that the display panel 160 includes three touch driving electrodes 170a to 170i in a width direction and three touch driving electrodes 170a to 170i in a length direction, and each touch driving electrode spatially overlaps four gate lines and three data lines, namely, corresponds to a total of twelve pixels.

Figure 6:
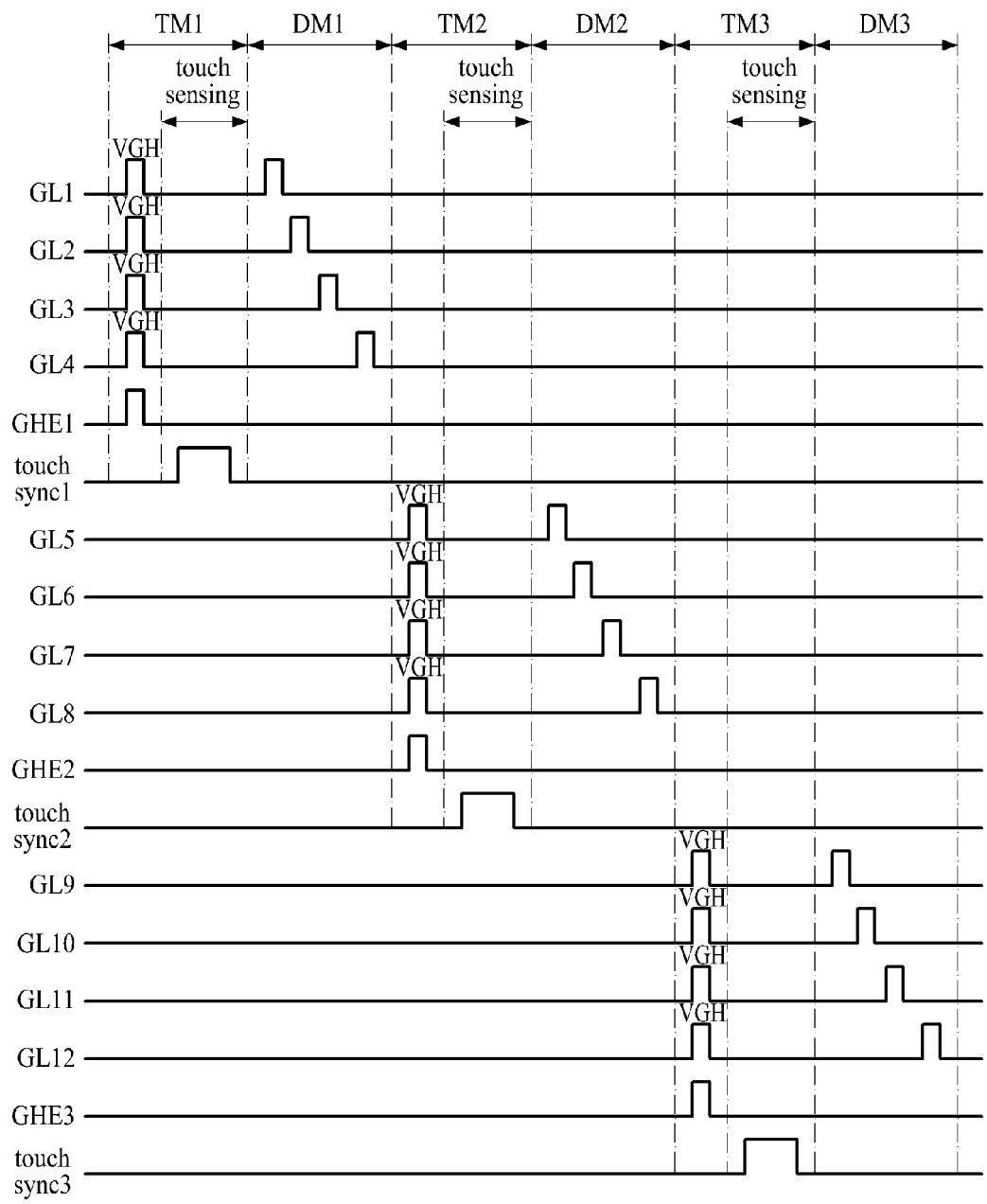
FIG. 6 is a diagram showing an operation in which a gate driver operates according to a gate high enable signal, in an embodiment of the display device according to the present invention.
Figure 7:
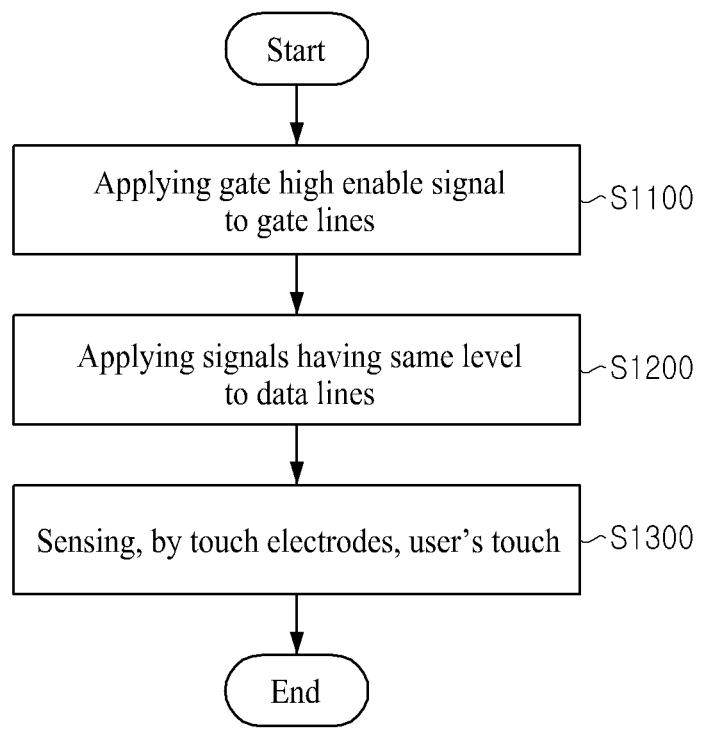
FIG. 7 is a flowchart illustrating an embodiment of a touch sensing method of the display device according to the present invention.

FIG. 6 is a diagram showing an operation in which the gate driver 120 operates in response to a gate high enable signal, in an embodiment of the display device according to the present invention. FIG. 7 is a flowchart illustrating an embodiment of a touch sensing method of the display device according to the present invention.

Referring to FIG. 7, the touch sensing method of the display device according to the present invention temporally divides one frame period (into a time period in which an image is to be displayed and a time period in which a user's touch is to be sensed) and drives the display panel 160 such that a display mode for displaying an image in the display panel 160 and a touch mode for sensing a user's touch are alternately driven.

In the touch sensing method of the display device according to the present invention, a plurality of switching elements which are respectively connected to a plurality of gate lines are first turned on in operation S1100. The plurality of gate lines spatially overlap a touch electrode that is the minimum unit for sensing a user's touch.

In an embodiment, when the gate high enable signal GHE is input to the gate driver 120 from the timing controller 110, operation S1100 of turning on the switching elements may apply the gate high voltage VGH to the gate lines spatially overlapping the touch electrode to turn on the switching elements by using the gate driver 120.

When the switching elements are turned on, display data having the same level are output from the data driver 130 to a plurality of data lines spatially overlapping the touch electrode in operation S1200.

In an embodiment, when the switching elements respectively connected to the gate lines spatially overlapping the touch electrode are turned on, the operation S1200 of outputting the display data may output display data having a level for black display to the data lines spatially overlapping the touch electrode by using the data driver 130.

The touch electrode senses a user's touch in response to the touch sync signal in operation S1300.

Subsequently, during the display mode, display data for displaying an image are output to the data lines spatially overlapping the touch electrode.

Hereinafter, a more detailed description will be made with reference to FIGS. 4 and 6.

FIG. 6 is a diagram showing the driving of the gate driver when a total of three touch driving lines TX1 to TX3 are provided as in FIG. 4.

First, in a first touch sensing mode TM1, when a gate high enable signal GHE1 is output from the timing controller 110 to the gate driver 120, the gate driver 120 outputs the gate high voltage VGH to a plurality of gate lines GL1 to GL4 spatially overlapping the touch driving electrodes 170a to 170c. When a plurality of switching elements connected to the respective gate lines GL1 to GL4 are turned on, the data driver 130 outputs display data having the same level to a plurality of data lines spatially overlapping the touch electrodes 170a, 170b and 170c.

Subsequently, when a touch sync signal "touch sync1" for enabling the touch driving electrodes 170a to 170c (connected to the first touch driving line TX1) to sense a user's touch is input, the touch driver 140 applies a driving signal to the first touch driving line TX1 to sense the user's touch through a touch sensing line. (Subsequently, when a touch sync signal "touch sync 1" is input from the timing controller 110 to the touch sensing unit 150, the touch driver 140 applies a driving signal to the touch driving electrode 170a, 170b, and 170c through the touch driving line TX1, and the touch sensing unit 150 senses a user's touch based on a sensing signals received from the touch sensing electrode 180 through the touch sensing lines RX1-RX3).

Then, to display an image in a first display mode DM1, the gate lines GL1 to GL4 are turned on, and display data are applied through respective data lines.

The user's touch is sensed by the touch sensing unit 150 through the first touch driving line TX1 in this way, and then, the following operation is performed for sensing a user's touch by the touch sensing unit 150 through a second touch driving line TX2.

First, in a second touch sensing mode TM2, when a gate high enable signal GHE2 is output from the timing controller 110 to the gate driver 120, the gate driver 120 outputs the gate high voltage VGH to a plurality of gate lines GL5 to GL8 spatially overlapping the touch driving electrodes 170d to 170f. When a plurality of switching elements connected to the respective gate lines GL5 to GL8 are turned on, the data driver 130 outputs display data having the same level to a plurality of data lines spatially overlapping the touch electrodes 170d, 170e, and 170f.

Subsequently, when a touch sync signal "touch sync2" for enabling the touch driving electrodes 170d to 170f (connected to the second touch driving line TX2) to sense a user's touch is input, the touch driver 140 applies a driving signal to the second touch driving line TX2 to sense the user's touch through a touch sensing line. (Subsequently, when a touch sync signal "touch sync 2" is input from the timing controller 110 to the touch sensing unit 150, the touch driver 140 applies a driving signal to the touch driving electrode 170d, 170e, and 170f through the touch driving line TX2, and the touch sensing unit 150 senses a user's touch based on a sensing signals received from the touch sensing electrode 180 through the touch sensing lines RX1-RX3).

Then, to display an image in a second display mode DM2, the gate lines GL5 to GL8 are turned on, and display data are applied through respective data lines.

The user's touch is sensed by the touch sensing unit 150 through the second touch driving line TX2 in this way, and then, the following operation is performed for sensing a user's touch by the touch sensing unit 150 through a third touch driving line TX3 disposed on a last row.

First, in a third touch sensing mode TM3, when a gate high enable signal GHE3 is output from the timing controller 110 to the gate driver 120, the gate driver 120 outputs the gate high voltage VGH to a plurality of gate lines GL9 to GL12 spatially overlapping the touch driving electrodes 170g to 170i. When a plurality of switching elements connected to the respective gate lines GL9 to GL12 are turned on, the data driver 130 outputs display data having the same level to a plurality of data lines spatially overlapping the touch electrodes 170g, 170h, and 170i.

Subsequently, when a touch sync signal "touch sync3" for enabling the touch driving electrodes 170g to 170i (connected to the third touch driving line TX3) to sense a user's touch is input, the touch driver 140 applies a driving signal to the third touch driving line TX3 to sense the user's touch through a touch sensing line. (Subsequently, when a touch sync signal "touch sync 3" is input from the timing controller 110 to the touch sensing unit 150, the touch driver 140 applies a driving signal to the touch driving electrode 170g, 170h, and 170i through the touch driving line TX3, and the touch sensing unit 150 senses a user's touch based on a sensing signals received from the touch sensing electrode 180 through the touch sensing lines RX1-RX3).

Then, to display an image in a third display mode DM3, the gate lines GL9 to GL12 are turned on, and display data are applied through respective data lines.

As described above, the present invention applies display data having the same level to a plurality of pixels corresponding to a touch sensing block during the touch mode, thus reducing the display touch crosstalk. Also, since the display touch crosstalk is reduced, noise to a touch signal decreases, thus enhancing the sensing rate and accuracy of user touch.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device, comprising:
    a display panel comprising:
        a plurality of touch sensing blocks, wherein each touch sensing block includes at least one touch driving electrode and one touch sensing electrode disposed in a column direction for sensing a user touch, and rows of pixels in the display panel share the one touch sensing electrode in the column direction;
        a plurality of gate lines and a plurality of data lines, some of the gate lines and some of the data lines overlapping the plurality of touch sensing blocks;
    a timing controller temporally dividing each frame period of a plurality of frame periods into a touch sensing period for sensing the user touch and a display mode period for displaying an image in the display panel, and driving the display panel such that the display mode period and the touch sensing period are alternately driven;
    a gate driver; and
    a data driver configured to provide display data to the plurality of data lines,
    wherein a touch sensing block of the plurality of touch sensing blocks is initialized during an initialization period before the touch sensing period of one frame period,
    wherein during the initialization period the gate driver simultaneously turns on a plurality of switching elements respectively connected to the gate lines overlapping the touch sensing block while the data driver outputs display data having a same level to the respective data lines overlapping the touch sensing block, and
    wherein at least two touch sensing blocks are initialized in different frame periods.

2. The display device of claim 1, wherein when a gate high enable signal is input from the timing controller, the gate driver applies a gate high voltage to the gate lines overlapping the touch sensing block to turn on the switching elements.

3. The display device of claim 1, wherein the gate driver simultaneously turns on the switching elements respectively connected to the gate lines overlapping the touch sensing block in the touch sensing period, and then, in the display mode period, sequentially turns on the switching elements respectively connected to the gate lines overlapping the touch sensing block.

4. The display device of claim 1, wherein the data driver outputs the display data having the same level to the data lines overlapping the touch sensing block during the initialization period before the touch sensing period, and then, in the display mode period, outputs the display data for displaying the image to the data lines overlapping the touch sensing block.

5. The display device of claim 1, wherein the display data having the same level are display data having a level for black display.

6. The display device of claim 1, wherein the timing controller outputs a gate high enable signal to enable the gate driver to output a gate high voltage during the initialization period, and then outputs a touch sync signal during the touch sensing period.

7. The display device of claim 6, further comprising a touch sensing unit which, in response to the touch sync signal, determines whether there is the user touch based on a sensing signal received from the one touch sensing electrode.

8. The display device of claim 6, further comprising a touch driver applying a driving signal to the at least one touch driving electrode when the touch sync signal for enabling the at least one touch driving electrode is input from the timing controller.

9. The display device of claim 1, further comprising:
    a pixel electrode disposed in each of a plurality of pixel areas defined by intersection of the plurality of gate lines and the plurality of data lines which are arranged to intersect each other on a substrate; and
    a common electrode generating an electric field together with the pixel electrode in the display mode period, and sensing a capacitance changed by the user touch in the touch sensing period,
    wherein the at least one touch driving electrode and one touch sensing electrode are formed by patterning the common electrode.

10. The display device of claim 1, wherein the touch sensing period is maintained for a time period shorter than a time period in which the display mode period is maintained.

11. A display device, comprising:
    a display panel having a plurality of touch sensing blocks, wherein each touch sensing block includes at least one touch driving electrode and one touch electrode disposed in a column direction for sensing a user touch, and rows of pixels in the display panel share the one touch electrode in the column direction, the plurality of touch sensing blocks overlapping a plurality of gate lines and a plurality of data lines; and
    a timing controller temporally dividing each frame period of a plurality of frame periods into a touch sensing period for sensing the user touch and a display mode period for displaying an image in the display panel, and driving the display panel such that a display mode and a touch mode are alternately driven, wherein a touch sensing block of the plurality of touch sensing blocks is initialized during a initialization period before the touch sensing period of one frame period, wherein during the initialization period a portion of the display panel corresponding to the touch sensing block is initialized by applying a display data having a same level to the respective data lines overlapping the touch sensing block, and wherein at least two touch sensing blocks are initialized in different frame periods.

12. The display device of claim 11, further comprising a data driver outputting the display data having the same level to the respective data lines overlapping the touch sensing block.

13. The display device of claim 11, further comprising a gate driver simultaneously turning on a plurality of switching elements respectively connected to the gate lines overlapping the touch sensing block during the initialization period, wherein the display data having the same level is applied to the respective data lines overlapping the touch sensing block when the switching elements are turned on.

14. The display device of claim 13, wherein the gate driver sequentially turns on the switching elements respectively connected to the gate lines overlapping the touch sensing block in the display mode period.

15. The display device of claim 11, wherein the display data having the same level are display data having a level for black display.

16. The display device of claim 11, wherein the timing controller outputs a touch sync signal for enabling the at least one touch driving electrode in the touch sensing period.

17. The display device of claim 16, further comprising a touch sensing unit which, in response to the touch sync signal, determines whether there is the user touch based on a sensing signal received from the one touch sensing electrode.

18. The display device of claim 16, further comprising a touch driver applying a driving signal to the at least one touch driving electrode when the touch sync signal is input from the timing controller.

19. The display device of claim 11, further comprising:

a pixel electrode disposed in each of a plurality of pixel areas defined by intersection of the plurality of gate lines and the plurality of data lines which are arranged to intersect each other on a substrate; and a common electrode generating an electric field together with the pixel electrode in the display mode, and sensing a capacitance changed by the user touch in the touch mode, wherein the touch sensing block is formed by patterning the common electrode.

20. The display device of claim 11, wherein the touch sensing period is maintained for a time period shorter than a time period in which the display mode period is maintained.

* * * * *